United States Patent Office 2,971,400
Patented Feb. 14, 1961

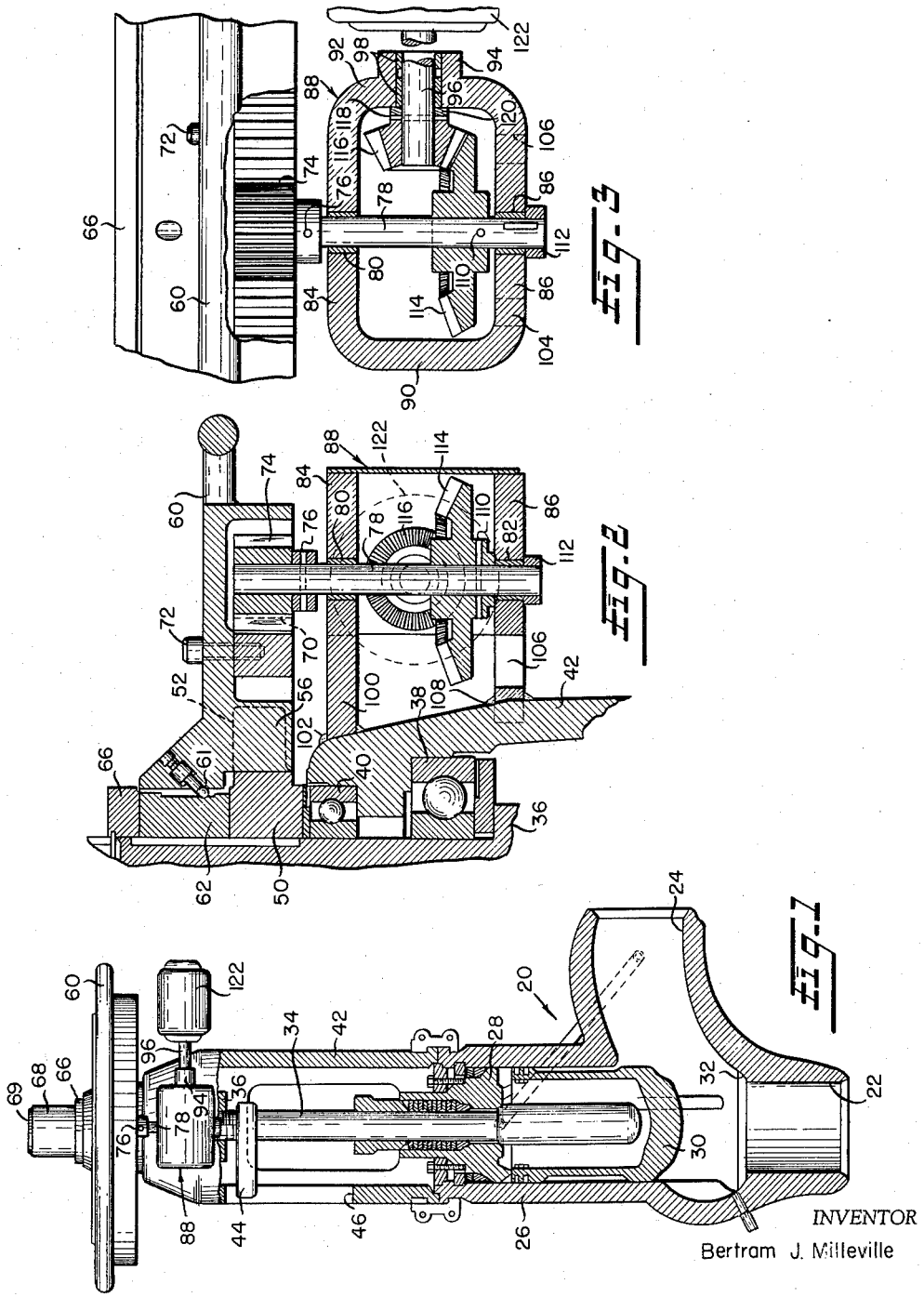

2,971,400
VALVE OPERATING MECHANISM

Bertram J. Milleville, Wadsworth, Ohio, assignor to Edward Valves, Inc., East Chicago, Ind., a corporation of Delaware Original application Apr. 9, 1957, Ser. No. 651,732, now Patent No. 2,942,495, dated June 28, 1960. Divided and this application May 26, 1960, Ser. No. 31,926

4 Claims. (Cl. 74—625)

This invention relates to valve constructions and more particularly to apparatus for moving the closure elements of valves used in high pressure, high temperature service between open and closed positions.

For present purposes the invention will be disclosed as applied to a valve of the type shown in United States Patent No. 2,665,874. Valves of this type are used to control the flow of fluids at pressures up to 3000 p.s.i. and higher and are provided in a range of sizes, the larger sizes having a closure element fourteen inches or more in diameter and a stem four inches or more in diameter. The travel of the valve closure element between open and closed positions may be 14 inches or more. Valves of this type are usually opened and closed by rotation of a threaded stem bushing operated by a handwheel. While the valve closure elements may be moved toward and away from a position close to the final seated position with a substantially constant relatively high torque, a substantially higher torque is required to move the valve toward or away from its fully closed finally seated position.

Generally the torque required to move the valve closure elements throughout the major portion of its travel can be developed by one or two men. However, the manual opening and closing of the valve is a time-consuming process and in the case of larger valves could require an hour or more of the time of two or three men. Generally in order to provide the extreme torque required for final closing or initial opening of the valve an impact imparting handwheel assembly is used as shown in the aforementioned patent.

In view of the time-consuming and laborious nature of the work involved in opening and closing such valves, many expedients such as gear drives or electric, hydraulic or pneumatic motors have been proposed to facilitate the performance of this operation. However, none of these expedients has proved entirely satisfactory. In the case of gear drives and other mechanical expedients employed to increase the mechanical advantage of the system, the time required to move the valve between open and closed positions is usually increased to an unreasonable value. While various motor operators have proved to be satisfactory in service, nevertheless they require expensive maintenance and may increase the cost of a large high pressure gate or globe valve as much as 50%.

The most effective prior solution to this problem is disclosed in United States Patent 2,855,940. In the system disclosed and claimed therein a relatively small motor is permanently installed on the valve and connected through a gear drive to the cross arm assembly of the impact developing handwheel assembly. To minimize the expense of such an installation the motor is capable of developing only that torque which is required to move the valve to a position close to its final seating position or to move the valve in opening direction after the valve is unseated. The final seating movements of the closure as well as the initial unseating movements are effected through a joint operation of the motor drive and the impact developing handwheel. This system represents a substantial improvement over preceding systems and has met with favorable acceptance in the field. However, the cost of such an installation may add as much as $2000.00 to the cost of the valve. This cost is warranted in many cases where the valves are frequently operated. However, in many installations the setting of the valve remains unchanged for weeks or months at a time. In such cases the time-consuming and laborious manual operation of the valve, despite its many disadvantages, is preferable to the installation of the relatively expensive permanent motor dirve assembly.

It is accordingly the principal purpose and object of the present invention to provide improved simplified and relatively inexpensive valve operating mechanisms including a geared motor driven assembly.

This primary object is achieved by the provision in the preferred form of the invention of a valve operator assembly comprising a crossarm connected to the threaded stem operator, an impact developing handwheel adapted to impart heavy blows to said crossarm assembly to effect the final seating or initial unseating of the valve and a novel gear train connected to the crossarm or to the handwheel, the gear train terminating in a shaft adapted to receive the output shaft of a portable drive motor. Preferably the portable drive motor is from ⅕ to ¹⁄₁₀ the size required for motors as conventionally used and does not develop sufficient torque to finally seat the valve or to initially unseat it. Both the final seating of the valve and the initial unseating are effected through use of the impact developing handwheel.

Accordingly, it is a further important object of the present invention to provide novel valve operating mechanisms which provide for easy and rapid operation of the valves at a fraction of the cost of prior comparable systems.

It is a further object of the present invention to provide novel valve operator assemblies which may be incorporated in valves of standard construction such as those shown in the aforementioned Patent 2,665,874 with little or no modification and which thus may be readily installed on valves now in service in the field as well as new valves.

It is also an object of the present invention to provide improved valve operator assemblies which comprise a minimum number of structurally rugged, relatively inexpensive parts and which may be expected to provide a relatively long maintenance-free service life.

Additional objects and advantages will become apparent as the description proceeds in connection with the accompanying drawings in which:

Figure 1 is an elevation partly in section of a valve incorporating the operator assembly of the present invention;

Figure 2 is an enlarged fragmentary section of the valve of Figure 1; and

Figure 3 is a fragmentary section of the apparatus taken along line 3—3 of Figure 2.

Referring now more particularly to the drawings, the valve shown is generally of the type disclosed in the aforementioned United States Patent 2,665,874 and is of the angle non-return type. However, it is to be understood that the invention may also be applied to valves of other types including stop valves, gate valves, and other forms of globe valves.

The valve assembly shown in Figure 1 comprises generally a body 20 having inlet and outlet passages 22 and 24, respectively, and a tubular extension 26 in which a bonnet 28 is received. The valve closure member 30 is slidably received in the tubular extension 26 and cooperates with a seat 32 to control the passage of fluids through the valve. The closure member 30 may be moved toward the seat by gravity or by fluid flowing through the valve or may be positively moved toward closed position by a stem 34 threaded at its upper end into a yoke bushing 36 rotatably mounted by suitable thrust bearing assemblies 38 and 40 supported in a conventional manner on the yoke 42. Rotation of the bushing 36 in the bearing assemblies 38 and 40 produces axial movement of the stem which is held against rotary movement by a guide arm 44 non-rotatably secured to the stem and extending through an opening 46 in the yoke 42.

A crossarm assembly 50 is keyed to the yoke bushing 36 above the bearing 40 and is provided with radially extending abutments 52 interposed in the path of lugs 56 formed on a handwheel assembly 60 rotatably mounted by bearings 61 on an adapter 62 keyed to the upper portion of the yoke bushing 36. A cap assembly comprising a ring 66 threaded onto the upper end of the bushing 36, a tubular extension 68 and a top cover member 69 is provided to close the upper end of the bore in the yoke bushing 36.

After the abutments 52 are contacted by the lugs 56, a steady pull on the handwheel will cause the handwheel, the crossarm assembly and the yoke bushing to rotate together to move the stem axially to thereby move the valve toward open or closed position depending upon the direction of rotation of the handwheel. The relatively high torque necessary to seat or unseat the valve may be obtained by backing the handwheel off and rotating it rapidly through a portion of a revolution so that the lugs 56 strike the abutments 52 with a heavy impact. Usually a number of such impact blows are necessary to accomplish the desired result.

While the structure thus far described, which is essentially the same in operation as that shown in the aforesaid United States Patent 2,665,874, may be used to operate the valve through its full travel this manual operation is laborious and time-consuming and since the process may take over an hour it is ineffective under emergency conditions.

In accordance with the present invention an auxiliary drive mechanism is combined with the prior structure in a novel manner to operate the valve over the major portion of its travel.

The auxiliary drive mechanism includes a ring gear 70 attached by bolts 72 to the under side of the handwheel. The ring gear 70 meshes with a pinion 74 secured by a pin 76 to the upper end of a shaft 78 rotatably mounted in bushings 80 and 82 provided in the upper and lower arms 84 and 86, respectively, of the mounting bracket assembly indicated generally at 88. The upper and lower bracket arms 84 and 86 are integrally joined at one side by a vertical arm 90 and at the opposite side by a vertical arm 92 the latter including a mounting boss 94 in which a shaft 96 is rotatably supported on bushings 98. Projecting laterally from the central portion of the upper arm 84 is a mounting bracket 100 terminating at its free end in an arcuate surface welded as at 102 to the yoke 42. The lower arm 86 is provided with a pair of spaced laterally projecting arms 104 and 106 each terminating at their inner ends in arcuate surfaces welded as at 108 to the yoke 42.

Non-rotatably secured to the shaft 78 by a pin 110 above a thrust washer 112 is a gear 114 which meshes with a pinion 116 secured by a pin 118 to the inner end of shaft 96. A thrust washer 120 is provided between the adjacent surfaces of the arm 92 and the pinion 116. The outer end of the shaft 96 is provided with a suitable squared, splined or similar formation for receiving an auxiliary drive motor 122. It will be noted that the axis of the drive shaft 96 is tangential of the yoke 42 to reduce the overall size of the mechanism and to assure that all parts of the auxiliary drive mechanism will be mounted within the periphery of the handwheel. If desired the gear train may be partially enclosed by a protective sheet metal cover plate 123. Alternately the entire gear train may be enclosed in a conventional cast housing.

In a typical case the apparatus provides a total gear ratio of 17.5:1 which is considerably higher than the ratio conveniently obtainable with a single pair of gears. This is achieved through the use of a pinion 116 having a pitch diameter of three inches, a gear 114 having a pitch diameter of 7.5 inches, a pinion 74 having a pitch diameter of 3 inches and a ring gear 70 having a pitch diameter of 21 inches.

Several types of relatively small reversible motors or motor drive units may be employed to drive the shaft 96. In accordance with the present invention, a relatively small motor, for example, ¾ horsepower, is employed for this purpose. If desired, a standard portable air powered drill may be used. In all cases the driver will be relatively small since it is not intended to be used to fully seat or unseat the valve closure. These latter operations are effected by operation of the impact developing handwheel in the normal manner. In practice, the auxiliary drive will be used to effect approximately 90% to 99% of the movement of the valve stem, the remainder to be produced by operation of the impacting handwheel.

In a typical case, assuming the valve to be fully opened, the portable driver is connected to the shaft 96 and rotated in the proper direction to produce closing movement of the valve. In most cases, the closing movement will be continued until the closure member contacts the seat at which time the resistance to stem travel will exceed the torque applied by the portable driver and will cause the latter to stall. Final seating of the valve may then be effected by operation of the handwheel. If the valve is fully seated, it will be initially started toward the open position by suitable operation of the handwheel. As soon as the closure member is free of the seat, the torque developed by the portable driver will be sufficient to move the valve to any desired open position. By the utilization of the novel apparatus of the present invention the time and effort necessary to operate the valve under any condition will be substantially reduced at a much lower cost than that attendant with prior motor operated valves.

This application is a division of copending application serial No. 651,732 filed April 9, 1957, and now Patent No. 2,942,495 granted June 28, 1960 for Valve Operating Mechanism.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a valve having a threaded stem element axially movable by relative rotation of said stem element and a mating threaded element mounted on the valve, drive means for effecting said relative rotation comprising, a drive assembly drivingly connected to one of said elements and having radial abutments; a handwheel mounted for free rotation about the axis of said stem and having surfaces adapted to engage said abutments after limited rotation of said handwheel; a ring gear rigid with said handwheel; a bracket assembly rigid with said valve beneath said handwheel and projecting radially outwardly from said valve; a first shaft mounted for rotation in said bracket assembly about an axis parallel to the axis of said stem, said shaft projecting upwardly from said bracket assembly; a pinion non-rotatably secured to the projecting upper end of said shaft and meshing with said ring gear; a bevel gear non-rotatably secured to said shaft adjacent the lower end thereof; a second shaft mounted in said bracket assembly for rotation about an axis normal to the axis of said first shaft; one end of said second shaft projecting outwardly of said bracket assembly, a bevel gear on the other end of said second shaft meshing with said bevel gear on said first shaft, and means on the projecting end of said second shaft adapted to be drivingly connected to a portable motor whereby operation of said motor will rotate said drive means and move said stem axially.

2. In a valve having a threaded stem element axially movable by relative rotation of said stem element and a mating threaded element mounted on the valve, drive means for effecting said relative rotation comprising, a drive assembly drivingly connected to one of said elements and having radial abutments; a handwheel assembly mounted for free rotation about the axis of said stem and having surfaces adapted to engage said abutments after limited rotation of said handwheel assembly; a ring gear rigid with one of said assemblies; a bracket assembly rigid with said valve beneath said handwheel assembly and projecting outwardly from said valve; a first shaft mounted for rotation in said bracket assembly about an axis parallel to the axis of said stem, said shaft projecting upwardly of said bracket assembly, a pinion non-rotatably secured to the projecting upper end of said shaft and meshing with said ring gear; a gear non-rotatably secured to said shaft adjacent the lower end thereof; a second shaft rotatably mounted in said bracket assembly; one end of said second shaft projecting from said bracket assembly, a gear on the other end of said second shaft meshing with said gear on said first shaft, and means on the projecting end of said second shaft adapted to be drivingly connected to a portable motor whereby operation of said motor will move said stem axially.

3. In a valve having a threaded stem element axially movable by relative rotation of said stem element and a mating threaded element mounted on the valve, drive means for effecting said relative rotation comprising, a drive assembly drivingly connected to one of said elements and having radial abutments; a handwheel mounted for free rotation about the axis of said stem and having surfaces adapted to engage said abutments after limited rotation of said handwheel; a ring gear rigid with said handwheel; a bracket assembly secured to said valve beneath said handwheel and projecting radially outwardly from said valve; a first shaft mounted in upper and lower bearings in said bracket assembly for rotation about an axis parallel to the axis of said stem, said shaft projecting upwardly of said bracket assembly, a pinion non-rotatably secured to the projecting upper end of said shaft and meshing with said ring gear; a bevel gear non-rotatably secured to said shaft between said bearings; a second shaft mounted in said bracket assembly for rotation about an axis normal to the axis of said first shaft and tangentially of the axis of said stem; one end of said second shaft projecting outwardly of said bracket assembly, a bevel gear on the other end of said second shaft meshing with said bevel gear on said first shaft and means on the projecting end of said second shaft adapted to be drivingly connected to a portable motor whereby operation of said motor will move said stem axially.

4. An operator for a valve having a stem threaded into a bushing rotatably mounted in a yoke and fixed against axial movement therein whereby rotation of said bushing moves said stem axially, comprising: a drive assembly rotatable with said bushing and having radial abutments; a handwheel mounted for free rotation about the axis of said stem and having surfaces adapted to engage said abutments after limited rotation of said handwheel; a ring gear rigid with said handwheel; a bracket assembly secured to said yoke beneath said handwheel and projecting radially outwardly from said yoke; a first shaft mounted for rotation in said bracket assembly about an axis parallel to the axis of said stem, said shaft projecting upwardly of said bracket assembly, a pinion non-rotatably secured to the projecting upper end of said shaft and meshing with said ring gear; a bevel gear non-rotatably secured to said shaft adjacent the lower end thereof; a second shaft mounted in said bracket assembly for rotation about an axis normal to the axis of said first shaft; one end of said second shaft projecting outwardly of said bracket assembly, a bevel gear on the other end of said second shaft meshing with said bevel gear on said first shaft, and means on the projecting end of said second shaft adapted to be drivingly connected to a portable motor whereby operation of said motor will rotate said stem bushing and move said stem axially.

References Cited in the file of this patent

UNITED STATES PATENTS

| | | |
|---|---|---|
| 1,731,314 | Mohr | Oct. 15, 1929 |
| 1,943,854 | Beckwith | Jan. 16, 1934 |
| 2,709,062 | Lamb | May 24, 1955 |
| 2,845,814 | Milleville | Aug. 5, 1958 |
| 2,855,940 | Milleville et al. | Oct. 14, 1958 |